United States Patent

Wheaton

Patent Number: 5,697,756
Date of Patent: Dec. 16, 1997

[54] APPARATUS FOR LIFTING AND MOVING LARGE ROLLS OF MATERIAL

[75] Inventor: Robert A. Wheaton, Windsor, Conn.

[73] Assignee: Moore Business Forms, Inc., Grand Island, N.Y.

[21] Appl. No.: 587,956

[22] Filed: Jan. 17, 1996

[51] Int. Cl.$^6$ .................................................. B66C 23/00
[52] U.S. Cl. ...................... 414/680; 242/559.1; 280/79.6; 414/919
[58] Field of Search .......................... 414/680, 908, 414/910, 911, 82, 84, 24.6, 549, 749; 242/399.1, 399.2, 559.1, 559.4, 597, 403, 403.1, 557; 188/2 F, 72.9; 280/79.6, 79.7

[56] References Cited

U.S. PATENT DOCUMENTS

| | | | |
|---|---|---|---|
| 1,416,000 | 5/1922 | De Costner. | |
| 1,702,971 | 2/1929 | Jeffress. | |
| 2,771,251 | 11/1956 | Silverstein | 242/68 |
| 3,743,198 | 7/1973 | Lucas | 242/58 |
| 3,912,189 | 10/1975 | Bauer | 242/75.43 |
| 4,022,393 | 5/1977 | Curcio | 242/55.2 |
| 4,121,783 | 10/1978 | Wölfinger et al. | 242/68.4 |
| 4,589,811 | 5/1986 | Riccardo et al. | 242/559.1 X |
| 4,856,960 | 8/1989 | Wheeler et al. | 414/684 |
| 4,895,315 | 1/1990 | Salmela et al. | 242/66 |
| 5,060,878 | 10/1991 | Hutzenlaub et al. | 242/68.4 |
| 5,246,180 | 9/1993 | Berry, III et al. | 242/54 |

FOREIGN PATENT DOCUMENTS 2257684  1/1973  United Kingdom ............ 414/911

*Primary Examiner*—Donald W. Underwood
*Attorney, Agent, or Firm*—McCormick, Paulding & Huber

[57] ABSTRACT

An apparatus is disclosed for lifting and moving large rolls of material, such as sheet material, which define a central core. The apparatus includes a wheeled frame, and a pair of guide ways that extend parallel to one another and across the frame. A lifting arm defines a lifting flange at one end, is rotatable about an axis oriented generally parallel to the guide ways, and is coupled at an end opposite of the lifting flange to one of the guide ways. An actuator couples the lifting arm to the other guide way, and rotates the lifting arm about the axis oriented generally parallel to the guide ways in order to move the lifting arm between raised and lowered positions. The lifting arm is slidable along the guide ways to permit the lifting flange to be positioned in a hollow core of a roll. Sliding movement of the lifting arm along the guide ways is selectively permitted by a brake mechanism including a brake pad in selective engagement with a guide way. The brake includes a handle that is coupled to the lifting arm and to the brake pad, and is rotatable about an axis oriented perpendicular to the guide way. The handle is biased into a central position, in which the brake pad engages a guide way, and is rotatable away from the central position into a second position, in which the brake pad is disengaged from the guide way to permit sliding movement of the lifting arm relative to the guide ways.

20 Claims, 4 Drawing Sheets

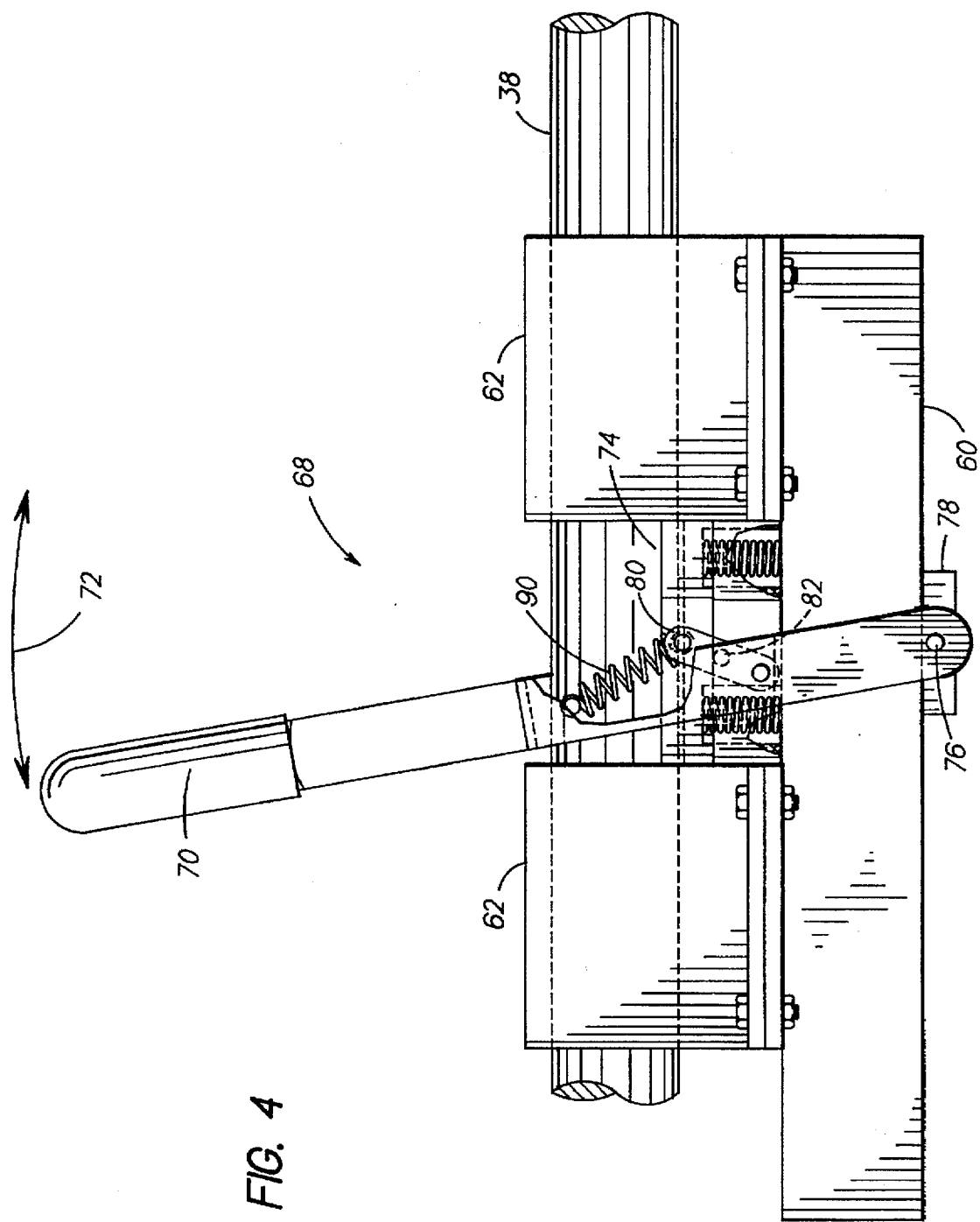

APPARATUS FOR LIFTING AND MOVING LARGE ROLLS OF MATERIAL

BACKGROUND OF THE INVENTION

The present invention relates generally to apparatus for handling sheet material, and relates more particularly to apparatus for lifting and moving large rolls of material.

Apparatus for lifting and moving large rolls of material, such as rolls of sheet material including paper and the like, are used for moving such rolls from one location to another, for example from a storage location to a loading position at a machine which consumes the sheet material during a work operation. One type of machine is employed to print multiple contracts or other information on the sheet material, and cuts the roll of sheet material into individual sheets in conjunction with printing. The sheet material is typically wound onto a spool or other structure which defines an axially-extending hollow core. During the work operation, the sheet material rotates about the core as it is unwound from the spool.

From time to time, a roll loaded in a machine must be replaced, for example to load a new roll of paper into the machine or to print on another type or color of paper, and another roll must be moved from a storage location to a position near the machine. Large rolls of sheet material such as paper are typically stored on a pallet or other structure, and accordingly must be lifted prior to being moved from the storage location to the machine. Large rolls typically weight hundreds of pounds, and are therefore too heavy to be lifted manually. Thus, an apparatus is needed for lifting the roll prior to moving the roll.

Known apparatus for handling large rolls of material range in complexity from simple handcarts onto which rolls are loaded and unloaded using a separate device to complex, expensive and fully-automated apparatus. Apparatus which require a separate device to load/unload the rolls have drawbacks. The requirement of an additional device adds expense, and the separate device for loading the rolls takes up additional floor space. In addition, an additional device typically requires separate operations for lifting and moving a roll, as well as separate maintenance. On the other hand, the fully-automated apparatus also have drawbacks. Such devices are typically more expensive, and the added complexity makes such apparatus more difficult and unreliable to operate.

It is accordingly an object of the present invention to provide an apparatus for handling large rolls of material, which apparatus is capable of both lifting and moving a roll, while also being of simple construction and easy operation.

SUMMARY OF THE INVENTION

The present invention relates generally to apparatus for handling sheet material, and relates more particularly to apparatus for lifting and moving large rolls of sheet material, for example for moving such rolls into and out of a machine which consumes sheet material during a work operation.

In accordance with the present invention, an apparatus is disclosed for lifting and transporting large rolls of material along a generally horizontal surface. The apparatus includes a frame, which defines a pair of opposite ends. One of the ends is open in order to receive therein a roll of sheet material.

A lifting arm is provided and has a pair of opposite ends. One of the ends of the lifting arm is positioned adjacent to the end of the frame opposite from the open end, and is horizontally movable relative to the frame. The end is also rotatable about a horizontally-oriented axis relative to the frame. The other end of the lifting arm terminates at a lifting end for engaging a roll of sheet material.

The apparatus also includes a brake for selectively permitting the horizontal movement of the lifting arm along the frame. The brake includes an axially-extending handle member, which is coupled to the lifting arm, and a brake pad, which is coupled to the handle and to the frame. The handle is mounted at one end for rotation about an axis oriented perpendicular to the horizontally-oriented axis, and is rotatable between first and second positions. In the first position, the handle moves the brake pad into operative engagement with the frame to prevent the horizontal movement of the lifting arm along the frame. In the second position, the handle moves the brake pad out of operative engagement with the frame to permit the horizontal movement of the lifting arm along the frame.

An advantage of the present invention is that the apparatus is relatively simple and easy to operate, while still being able to lift and move large rolls of sheet material.

An additional advantage of the present invention is that a handle which serves to engage/disengage the brake also serves as a lever to assist in the horizontal movement of the lifting arm to position the lifting arm along the frame. Thus, the brake is engaged or disengaged, and the lifting arm may be positioned, with a single motion of the handle.

Additional advantages will become apparent to those skilled in the art in view of the following specification and attached drawings.

BRIEF DESCRIPTION OF THE DRAWINGS

FIG. 4 is a view similar to FIG. 2, but illustrates a handle of the brake is in a second position, which disengages the brake and permits movement of the lifting arm along the frame.

DETAILED DESCRIPTION OF THE PREFERRED EMBODIMENT

Figure 1:
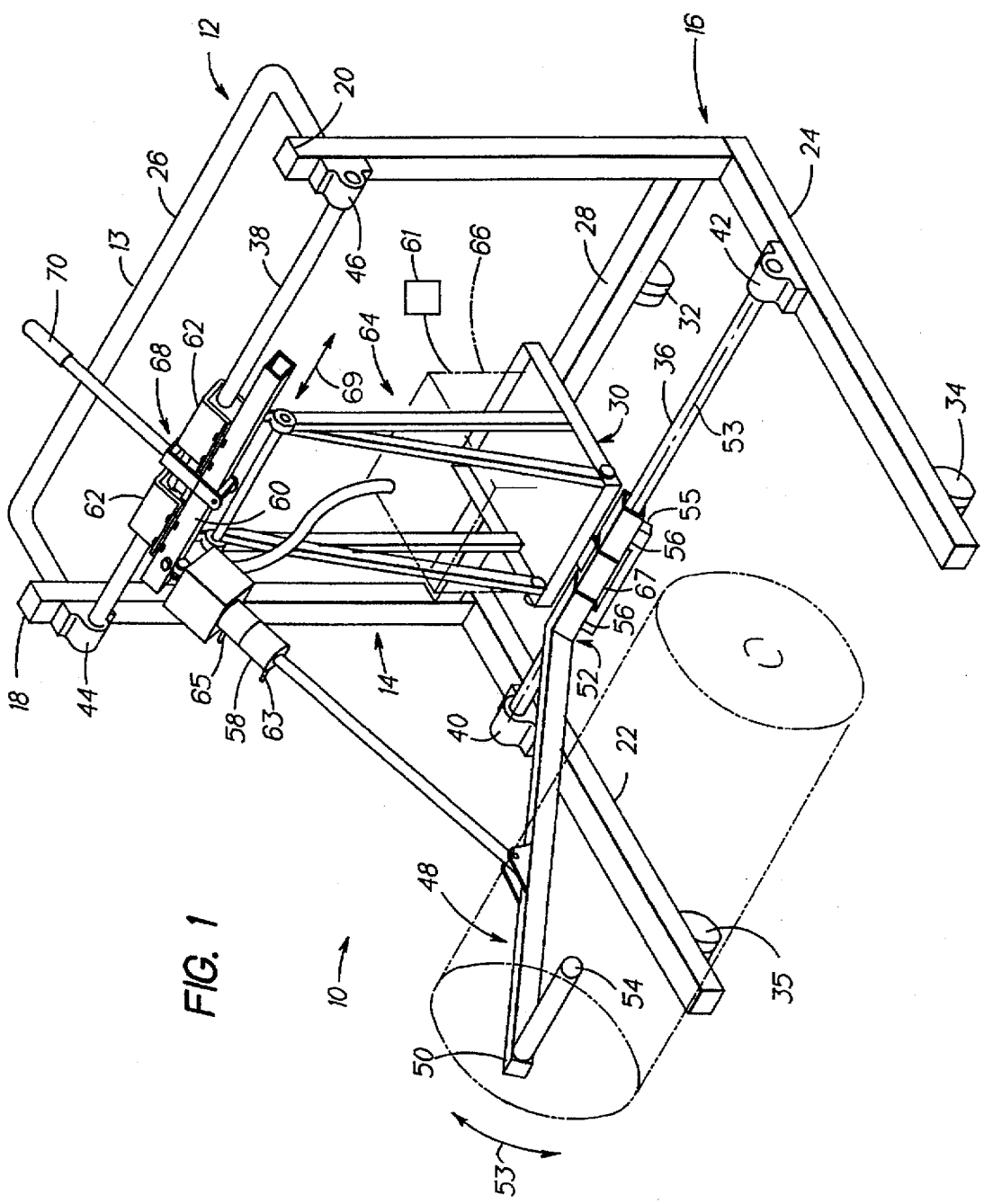
FIG. 1 is a schematic, perspective drawing of an apparatus for lifting and handling large rolls of material in accordance with the present invention, including a lifting arm and a brake mechanism coupled to a frame.

Turning now to FIG. 1, an apparatus is indicated at 10 for lifting and moving large rolls of material such as sheet material. While the present invention is described as being used with large rolls of sheet material such as paper, those skilled in the art will recognize that the invention may also be employed with other materials which are wound into rolls or onto roll cores, such as cable.

The apparatus 10 includes a rigid frame 12, which defines a pair of side frames 14, 16 coupled by a lateral frame 13. Each side frame 14, 16 has a respective vertical member 18, 20, and a horizontal member 22, 24. Each horizontal member 22, 24 is fixed to a bottom end of a respective vertical member 18, 20. The lateral frame 13 is positioned at one end of the frame 12, in the illustrated embodiment includes a top member 26, which extends between the top ends of the vertical members 18, 20. The top member 26 serves as a handle to facilitate movement of the apparatus, e.g., about a shop floor. A bottom member 28 extends between the bottom ends of the vertical members 18, 20.

Several heavy-duty casters 30, 32, 34, 35 are fixed to the frame 12 so that the apparatus may be moved about a work area. As illustrated in FIG. 1, two casters are fixed to the bottom member 28 at the back of the frame 12, and casters are attached to each end of a horizontal member 22, 24 near the front of the frame. The front of the frame 12 is open, so that the frame 12 can be wheeled into position to receive a roll, for example a roll that is stored at a storage location on a pallet or a roll mounted in a machine which consumes the sheet material on the roll.

A pair of guide ways 36, 38 extend between the side flames 14, 16 and parallel to one another. One of the guide ways 36 is a lower guide way and is shown as being fixed to the horizontal members 22, 24 of the side frames 14, 16 by brackets 40, 42. The lower guide way 36 is positioned on the side frames and towards the lateral frame 13. The other guide way 38 is an upper guide way and is fixed to the vertical members 18, 20 of the side flames 14, 16 by brackets 44, 46. The upper guide way 38 is preferably positioned toward the top of the vertical members 18, 20.

A lifting arm 48 has a pair of opposite ends 50, 52, and is coupled for horizontal movement along the guide ways 36, 38. One end 50 of the lifting arm 48 is a lifting end for engaging a roll of material, and is free to move in the direction of the arrow 53. The lifting end 50 carries a lifting flange 54 that is oriented perpendicular to the lifting arm. As is described further below, the lifting arm 48 is slidable along the guide ways to position the lifting flange 54 into and out of a hollow core or other portion of a roll of sheet material (indicated as dashed lines in FIG. 1), in order to lift and support a roll, for example to move a roll from a storage area to a loading position at a machine which consumes the sheet material during a work operation. Those skilled in the art will recognize that the lifting flange may alternatively be designed to support the bottom of a roll of sheet material, e.g., to support the roll from below.

The other end 52 of the lifting arm 48 is pivotally coupled to the frame for rotation about a horizontally-oriented axis 53. More specifically, the other end 52 of the lifting arm 48 is pivotally attached to a rigid member 55, which extends generally parallel to the guide ways. The rigid member 55 in turn is attached to a pair of lower bearing blocks 56, which are coupled to and rotatable about the lower guide way 36. As is further described below, the lower bearing blocks 56 are also slidable in a horizontal direction along the lower guide way 36.

The lifting arm 48 is also coupled, indirectly, to the upper guide way 38, so that the lifting arm is rotatable about the lower guide way 36 in a plane perpendicular to the guide ways. An actuator 58 extends between the upper guide way 38 and the lifting arm 48. The actuator 58 is pivotally coupled at one end along the lifting arm 48, and is pivotally coupled at the other end to a rigid member 60. Preferably, the member 55 and member 60 have a similar structure. The rigid member 60 extends parallel to the upper guide way 38, and is fixed to a pair of upper bearing blocks 62. The upper bearing blocks 62 are of a construction similar to the blocks 56, are coupled to and rotatable about the upper guide way 38, and are selectively slidable along the upper guide way 38, as is described further below.

The actuator 58 illustrated in FIG. 1 is electrically powered, although those skilled in the art will recognize that other types of devices, such as a manually-operated hydraulic jack, may also be employed to move the lifting arm in the direction of the arrow 52, in order to lift or lower a roll. A control unit 61 for the actuator 58 is provided, and is coupled to a pair of over-riding clutches, indicated schematically at 63, 65, which are positioned to define lower and upper bounds for movement of the lifting arm 48. In the alternative, limits switches may be employed in place of the clutches 63, 65.

A battery tray 64 is coupled to the upper and lower guide ways 38, 36 independently of the lifting arm. The tray 64 holds a power source 66, e.g., a battery, which is electrically coupled to the actuator 58. The top and bottom of the battery tray are supported by and pivotally connected to the upper bearing blocks and to a U-shaped block 67 to permit the bearing blocks to pivot about respective guide ways 36, 38. The block 67 is oriented so that the U is upside down, rests on the lower guide way 38 between the lower bearing blocks 56, and rotates about the lower guide way independently of the lower bearing blocks. The battery tray 64, together with the rigid members 55, 60, ensure that the bearing blocks 56, 62 slide equidistantly along a respective guide way 36, 38, in order to smoothly move the lifting arm 48 and any roll of sheet material supported thereby along the guide rails.

Figure 2:
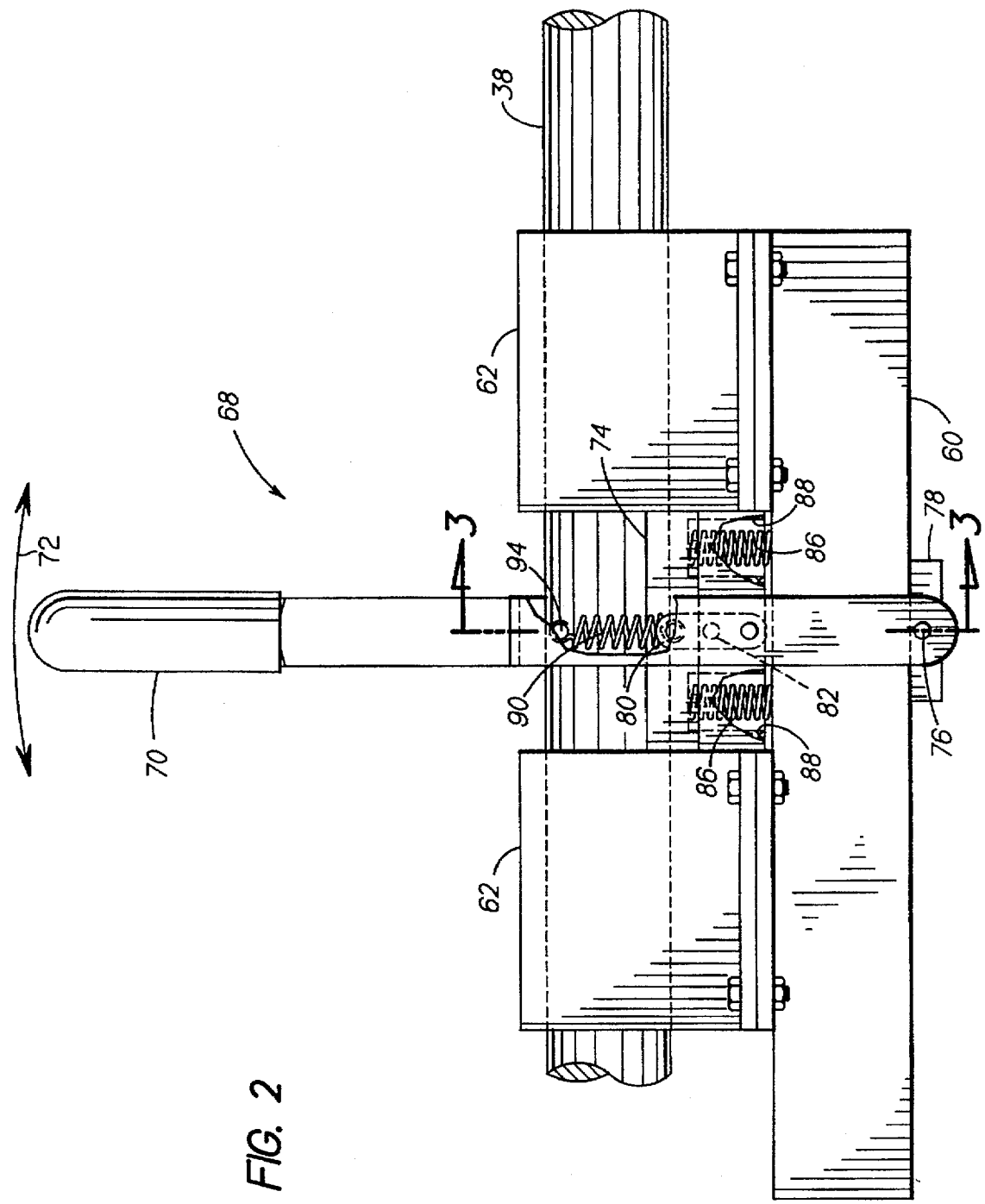
FIG. 2 is a fragmentary, schematic view illustrating a brake of FIG. 1 in more detail in a first, locking position in which the lifting arm of FIG. 1 is prevented from moving along the frame.
Figure 3:
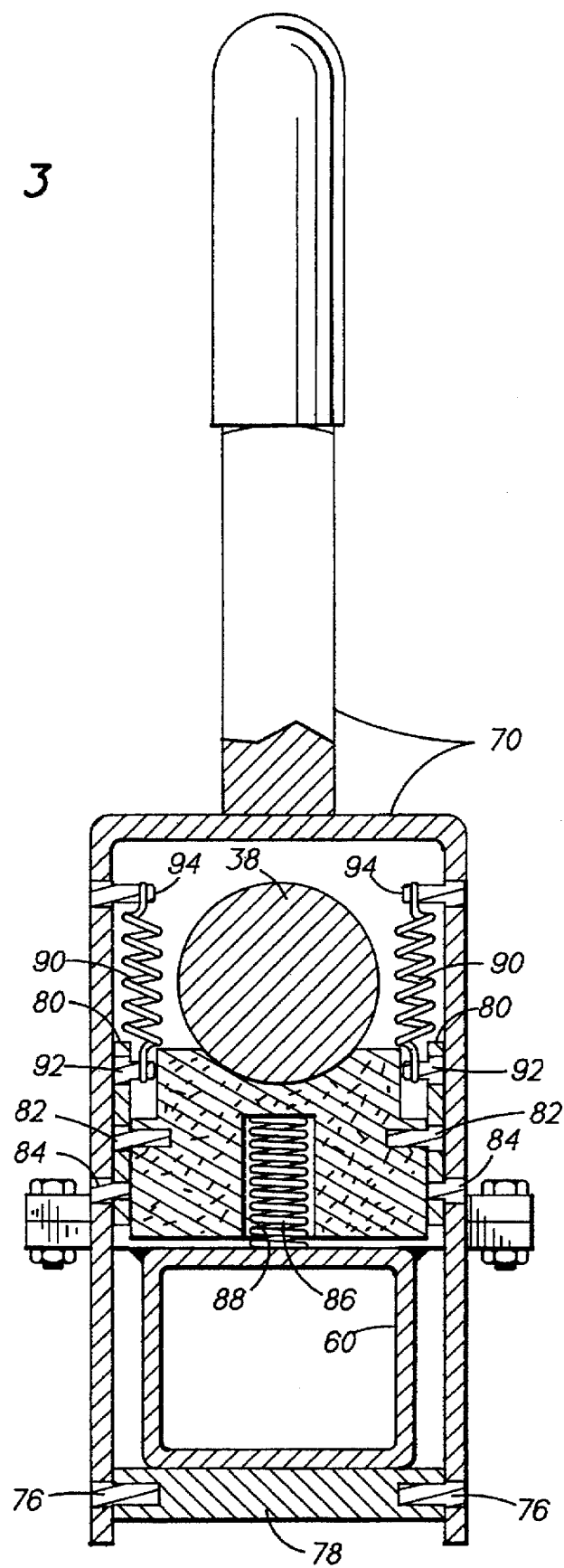
FIG. 3 is a sectional, schematic view of the brake of FIG. 2.

Movement of the upper bearing blocks 62 along the upper guide way 38, e.g., in the direction of arrow 69, and thus movement of the lifting arm 48 and of the lower bearing blocks 56, is controlled by a brake mechanism, indicated generally at 68. With reference to FIGS. 2 and 3, the brake mechanism 68 includes a handle 70, that is positioned generally between the upper bearing blocks 62, 62 and is rotatable in the direction of arrow 72, and a cooperating brake pad 74, that is shaped to complement the shape of the guide way and moves into and out of engagement with the upper guide way 38 as the handle is rotated. The handle 72 is mounted by a pair of pins 76 for rotation about a bracket 78, which in turn is fixed to the rigid member 60, to which the upper bearing blocks 62 are also attached. A pair of brake pad support levers 80, 80 is rotatably mounted on opposite sides of the brake pad 74 by pivot pins 82, and are also rotatably mounted to each side of the handle 70 by a separate pair of pivot pins 84, 84. Thus, rotation of the handle 70 one way or the other in the direction of the arrow 72, e.g., by manually moving the handle to the left or to the right in FIGS. 1 or 2, causes rotation of the brake pad support levers 80, 80 in a direction opposite to the direction of the handle rotation, as illustrated in FIG. 4, which moves the brake pad 74 away from the upper guide way 38, i.e., moving the brake pad in the vertical direction. Once the brake pad 74 is disengaged from the upper guide way 38, the handle 70 is also used as a lever to slide the bearing blocks 56, 62, and thus the lifting arm 48, relative to the guide ways 36, 38, for example to position the lifting arm 48 adjacent to the side 22 of the frame, so that the apparatus 10 can be moved to receive or to unload a roll of sheet material (shown in dashed lines in FIG. 1).

In the absence of moving and holding the handle away from the centered position, the handle 70 preferably returns to a centered, locking position, so that the brake 68 is positioned to lock the lifting arm 48 in place relative to the guide ways 36, 38. With reference again to FIGS. 2 and 3, the brake pad 74 is biased towards the upper guide way by a pair of springs 86, 86 compressed in recesses 88, 88, which are defined in the brake pad or in a support (not shown) for the brake pad. In addition, the handle 70 is biased into the centered, locking position, i.e., in the vertical orientation illustrated in FIG. 2, by springs 90, 90 that couple spring mounts 92, 92 fixed to the top end of the brake pad support levers 80, 80 and spring mounts 94, 94 fixed to the handle 70. Accordingly, the brake handle is biased into the locking position, i.e., vertically oriented, in which the brake pad 74 contacts the upper guide way 38, and therefore brake 68 and associated lifting arm (FIG. 1) are correspondingly prevented from movement along the guide ways. As discussed above, movement of the handle 70 away from the vertical, locking position illustrated in FIG. 2 moves the brake pad 74 away from the upper guide way 38, and permits movement of the upper bearing blocks 62 along the upper guide way 38 in order to position the lifting arm relative to the sides of the frame 12. The handle 70 also serves as a lever to assist in the movement of the beating blocks 56, 62 and the lifting arm along the guide ways. Upon releasing the handle 70, the handle returns to its central, locking position, thus preventing further movement of the bearing blocks and the lifting arm along the guide ways.

Various changes may be made to the present invention without departing from the spirit of the invention or the scope of the attached claims. Accordingly, it is understood that the present invention has been described by way of illustration and rather than limitation.

What is claimed is:

1. An apparatus for lifting and transporting large rolls of material along a generally horizontal surface, the apparatus comprising:
   a frame means defining a pair of opposite ends, one of the ends being open for receiving a roll of sheet material;
   a lifting arm having a pair of opposite ends, one of the ends being positioned adjacent to the end of the frame means opposite from the open end and coupled to the frame means for horizontal movement along and for rotation about a horizontally-oriented axis relative to the frame means, and the other end of the lifting arm terminating at a lifting end for engaging a roll; and
   means for selectively permitting horizontal movement of the lifting arm along the frame means, the means for selectively permitting horizontal movement including a longitudinally-extending handle member coupled to the lifting arm and brake pad means coupled to the handle member and to the frame means, the handle member being mounted at one end for rotation about an axis oriented perpendicular to an axis oriented parallel to the horizontally-oriented axis between a first position in which the handle moves the brake pad means into operative engagement with the frame means and prevents the horizontal movement of the lifting arm, and a second position in which the handle moves the brake pad means out of operative engagement with the frame means so that the lifting arm is horizontally moveable relative to the frame means.

2. The apparatus of claim 1, further comprising:
   means coupled to the frame means and to the lifting arm for rotating the lifting arm about the horizontally-oriented axis to move the lifting end of the lifting arm between a lowered position in which the lifting end is positioned to receive or unload a roll, and a raised position in which the lifting end is in a position higher than the lowered position to support a roll in a position off of and above the horizontal surface.

3. The apparatus of claim 1, wherein the means for selectively permitting horizontal movement of the lifting arm includes means for biasing the handle into the first position.

4. The apparatus of claim 2, further comprising:
   limit means for preventing the means for rotating from rotating the lifting arm above a predetermined, uppermost position and below a predetermined, lowermost position.

5. The apparatus of claim 1, further comprising:
   means coupled to the frame means for moving of the frame means relative to the horizontal surface and to move the frame means relative to a roll of sheet material not engaged by the arm.

6. The apparatus of claim 1, wherein the frame means define a pair of laterally-disposed sides and a pair of guide ways positioned opposite from the open end of the frame means, one guide way being an upper guide way and the other guide way being a lower guide way, and wherein the end of the lifting arm opposite of the lifting end is coupled to and rotatable about the horizontally-oriented axis, the horizontally-oriented axis being oriented parallel to the lower guide way, the apparatus further comprising:
   an actuator coupled for rotation relative to the upper guide way and to the lifting arm for rotating the lifting arm.

7. The apparatus of claim 1, wherein the lifting arm is horizontally moveable between a first, roll-receiving position in which the lifting arm is positioned adjacent to one side of the frame means, and a second, roll-engaging position in which the lifting arm is positioned away from the one side and towards the other side of the frame means.

8. The apparatus of claim 1, wherein movement of the handle between the first and second positions moves the handle in a plane oriented generally parallel to the direction of horizontal movement of the lifting arm.

9. The apparatus of claim 1, further comprising,
   an axially-extending link having a pair of opposite ends, one of the ends being rotatably attached to the handle, and the link being rotatably attached at an intermediate section to the brake pad means so that rotation of the handle in one direction causes rotation of the link in a direction opposite to the one direction and moves the brake pad relative to the frame means.

10. The apparatus of claim 9, wherein the end of the link opposite from the end coupled to the handle is coupled to the handle by spring means for biasing the handle into the first position.

11. The apparatus of claim 6, further comprising:
   a tray having upper and lower ends and extending between and rotatably coupled to the upper guide way and the lower guide way, the lower end of the tray being rotatable independently of the lifting arm.

12. In an apparatus for lifting and transporting large rolls of material along a generally horizontal surface, the apparatus including a frame defining a pair of opposite ends, one of the ends being open for receiving a roll of sheet material, a lifting arm having a pair of opposite ends one of which is coupled to the end of the frame opposite from the open end and the other end of which terminates in a lifting end for engaging a roll and a pair of horizontally-extending guide ways being coupled to the end of the frame opposite from the open end and to the end of the lifting arm opposite from the lifting end, the guide ways supporting the lifting arm for horizontal movement relative to the guide ways and along an axis oriented generally parallel to the guide ways, the combination comprising:
   brake pad means supported for movement perpendicular to at least one of the guide ways and into and out of operative engagement with said at least one of the guide ways;
   a handle coupled to the lifting arm and to one of the guide ways and mounted for rotation about an axis oriented perpendicular to said one of the guide ways; and
   means for coupling the handle and the brake pad means for moving the brake pad means into and out of operative engagement with said at least one of the guide ways upon rotation of the handle about the axis oriented perpendicular to said one of the guide ways for selectively permitting horizontal movement of the lifting arm relative to the guide ways in the direction of the horizontal axis.

13. The combination as defined in claim 12, wherein the handle is rotatable between first and second positions, and the means for coupling move the brake pad means into operative engagement with said at least one of the guide ways when the handle is in the first position to prevent horizontal movement of the lifting arm along the guide ways, and move the brake pad means out of operative engagement with said at least one of the guide ways when the handle is moved into the second position to permit horizontal movement of the lifting arm relative to the guide ways, and further comprising:

means for biasing the handle into the first position.

14. The combination as defined in claim 12, wherein the means for coupling further comprises:

an axially-extending link having a pair of opposite ends, one of the ends being rotatably attached to the handle, and the link being rotatably attached at an intermediate section to the brake pad means so that rotation of the handle in one direction causes rotation of the link in a direction opposite to the one direction.

15. The combination of claim 14, wherein the other end of the link is coupled to the handle by spring means for biasing the handle into the first position.

16. The combination of claim 12, further comprising:

a tray having upper and lower ends and extending between and rotatably coupled to the upper guide way and the lower guide way, respectively, the lower end of the tray being rotatable independently of the lifting arm.

17. An apparatus for lifting and transporting large rolls of sheet material, the apparatus comprising:

a frame having two oppositely-disposed ends, one end defining an opening for receiving a roll of sheet material;

a pair of guide ways attached to the frame at the end opposite the open end, the guide ways extending across the frame and parallel to one another and being spaced from one another so that one guide way is an upper guide way and the other guide way is a lower guide way;

a lifting arm extending in a direction generally perpendicular to the guide ways and having a pair of opposite ends, one of the ends being positioned adjacent to one of the guide ways and the other end defining a lifting end for engaging a roll of sheet material, the lifting arm being rotatable about a horizontal axis oriented parallel to the guide ways;

means coupled to the guide ways and to the lifting arm for supporting the lifting arm for sliding movement along and parallel to the guide ways;

means coupled to at least one of the guide ways and to the lifting arm for rotating the lifting arm about the horizontal axis; and a handbrake associated with the lifting arm for selectively permitting sliding movement of the lifting arm along and parallel to at least one of the guide ways, the handbrake comprising a longitudinally-extending handle member coupled to the means for supporting the lifting arm and to a brake pad supported for movement into and out of engagement with at least one of the guide ways, the handle member further being mounted at one end for rotation about an axis oriented perpendicular to the guide ways between a first position in which the brake pad is moved into engagement with at least one of the guide ways and horizontal movement of the lifting arm along and parallel to at least one of the guide ways is prevented and a second position in which the brake pad is moved out of engagement with said at least one of the guide ways to permit horizontal movement of the lifting arm along and parallel to the guide ways.

18. The apparatus defined in claim 17, wherein the handbrake further includes:

an axially-extending link having a pair of opposite ends, one of the ends being pivotably attached to the handle and also pivotably attached at an intermediate section to the brake pad, so that rotation of the handle in one direction causes rotation of the link in a direction opposite to the one direction.

19. The apparatus defined in claim 18, wherein the other end of the link is coupled to the handle by spring means for biasing the handle into the first position.

20. The apparatus as defined in claim 17, further comprising:

means coupled to the frame for moving the frame relative to the horizontal surface to move the frame relative to rolls of sheet material not engaged by the arm.

* * * * *